United States Patent [19]

Arnold et al.

[11] Patent Number: 5,076,508
[45] Date of Patent: Dec. 31, 1991

[54] START WIRE POSITIONING METHOD AND APPARATUS

[75] Inventors: Richard B. Arnold, Fort Wayne; Eugene R. Barrett, Columbia City, both of Ind.

[73] Assignees: Advanced Machine and Tool Corporation, Fort Wayne, Ind.; General Electric Company, New York, N.Y.

[21] Appl. No.: 467,153

[22] Filed: Jan. 19, 1990

[51] Int. Cl.[5] .......................... H02K 15/04; B21F 3/00
[52] U.S. Cl. .................................... 242/7.03; 29/596; 140/92.2; 242/7.09
[58] Field of Search ................... 242/1.1 E, 7.03, 7.09, 242/7.13; 29/596, 736; 140/92.2

[56] References Cited

U.S. PATENT DOCUMENTS

| 3,508,316 | 4/1970 | Hill | 242/7.09 X |
| 3,579,791 | 5/1971 | Arnold | 242/7.09 X |
| 3,672,026 | 6/1972 | Cutler et al. | 242/7.09 X |
| 3,724,515 | 3/1973 | Eminger | 140/92.1 |
| 4,269,235 | 5/1981 | Muskulus | 140/92.1 |
| 4,917,316 | 4/1990 | Suzuki | 242/4 R |

FOREIGN PATENT DOCUMENTS 1563094  5/1970  Fed. Rep. of Germany .
62-92309  4/1987  Japan ................................. 242/4 R

*Primary Examiner*—Joseph J. Hail, III
*Assistant Examiner*—William G. Battista, Jr.
*Attorney, Agent, or Firm*—Baker & Daniels

[57] ABSTRACT

A wire positioning mechanism and method for positioning a start wire of a coil bundle from the bottom of the coil bundle to the top of the coil bundle during winding of the coil. The mechanism includes a pivotable and retractable arm with a clamp assembly, a contacting finger, and a wire hook on one end thereof. The start wire is first deflected into the space between the two separated sections of a coil form by the contacting finger. The wire is then lightly clamped. The coil is then wound on the coil form so that the start wire will be positioned inside the coil. The wire hook is then activated to reposition the start wire through the coil bundle and out over the top of the coil bundle. The start wire positioning mechanism is then moved out of the way of the coil and the winding operation is completed.

24 Claims, 4 Drawing Sheets

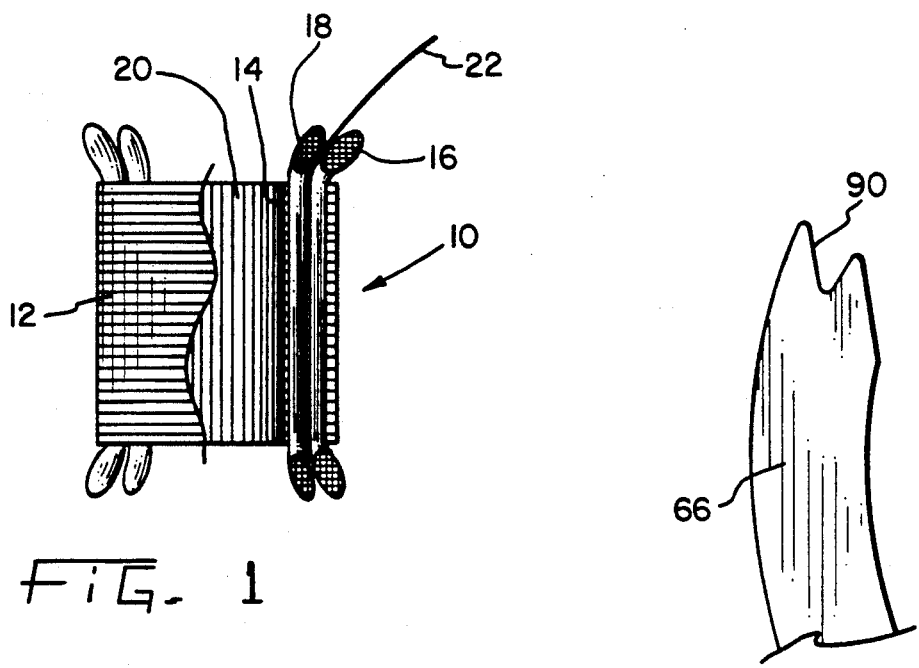
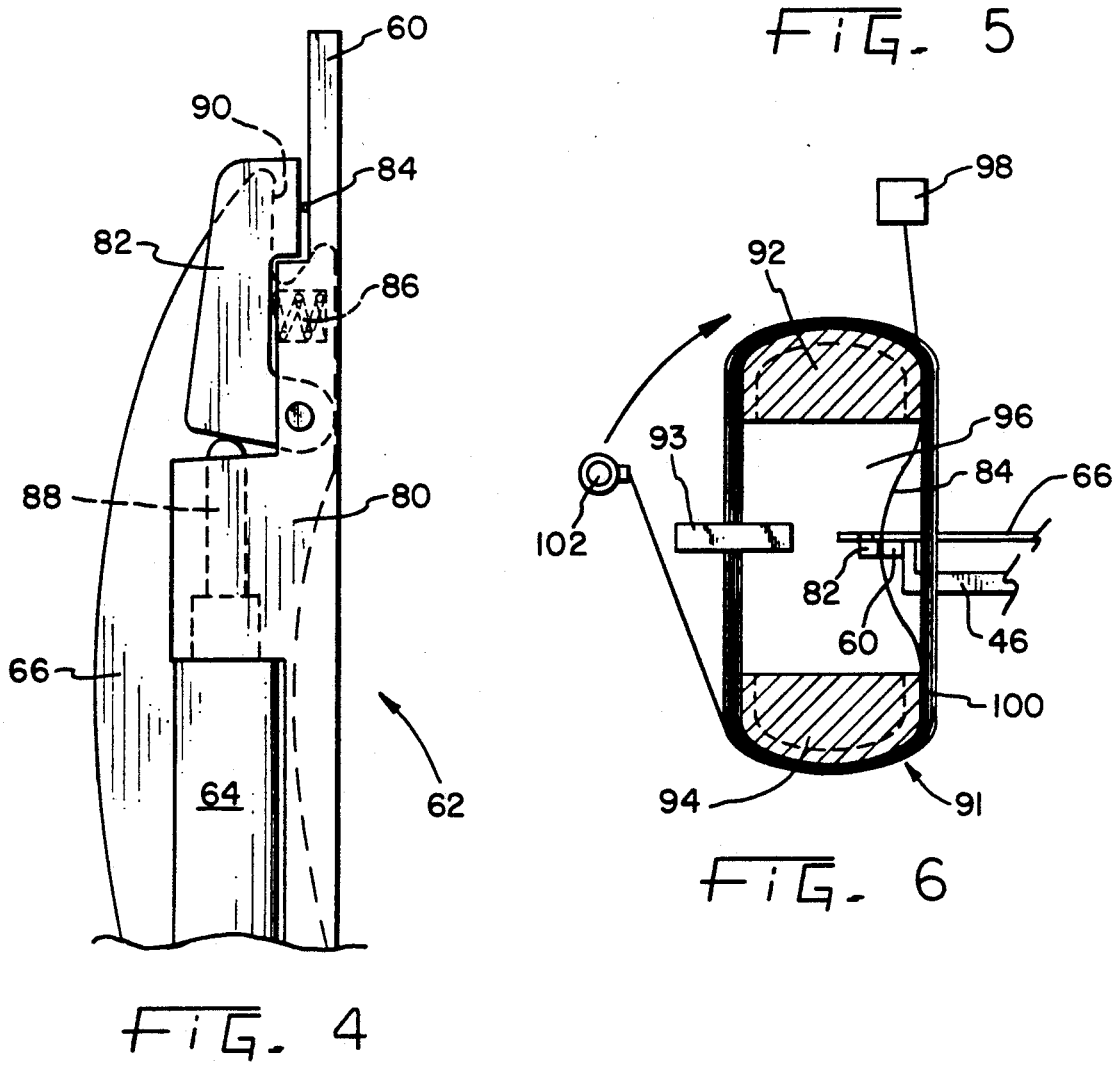

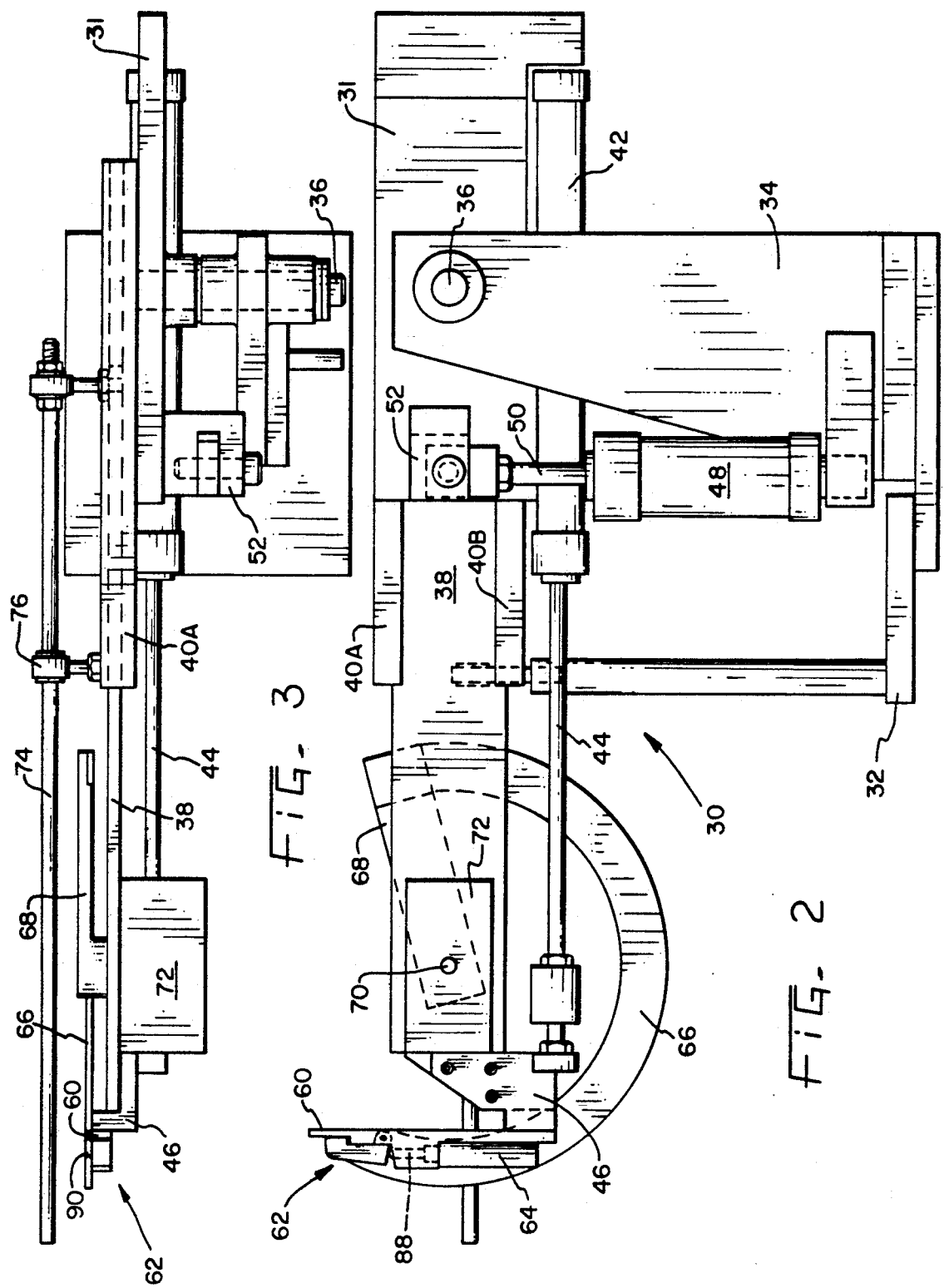

START WIRE POSITIONING METHOD AND APPARATUS

BACKGROUND OF THE INVENTION

This invention relates to a coil winding method and apparatus. More specifically this invention relates to positioning of a start wire of a wound coil prior to the insertion of the coil into the stator core of a dynamoelectric machine.

Conventionally, the stators of electric motors are manufactured by first providing a slotted core formed of a stack of laminations. Windings or coils are then wound and are subsequently inserted into the slots of the stator core. Quite often more than one set of windings is provided for an electric motor such as for instance a main winding and an auxiliary winding. The auxiliary winding is generally the last winding to be inserted into the stator core. Conventionally, the start wire of the auxiliary winding is located on the bottom of the coil bundle prior to the insertion of the winding into the core slots. Thus, after insertion, the start wire is located closest to the bore side of the stator core. This is not a very desirable location for the start or lead wire as in that position the start wire is quite vulnerable to damage from both the sharp edges of the laminations as well as from subsequent pressing and compressing operations in the windings. Thus it is desired to provide a method and apparatus for relocating or repositioning the start wire, after winding of a coil but prior to insertion of the coil into the stator core. In the prior art such repositioning has been accomplished manually by an operator who manually manipulated the wire from the bottom of the coil bundle to the top of the coil bundle. After insertion into the stator the start wire would then be located between the auxiliary coil and the main coil. Since this is a low density portion of the wire pack, the start wire would then be protected in the subsequent pressing and compressing operations. The disadvantage of the prior art manual method of repositioning the start wire has been that the process is cumbersome, time consuming and therefore costly.

It is therefore desired to provide a method and apparatus for automatically repositioning the start wire of a coil while the coil is being wound, so that, upon subsequent insertion of the coil into a stator core, the start wire is located in a protected location.

SUMMARY OF THE INVENTION

The present invention overcomes the disadvantages of the above described prior art manual start wire repositioning method by providing an automatic method and an apparatus therefor.

The method according to the present invention comprises positively positioning the start wire during winding of the coil and clamping it in that position while the coil is being wound. After the coil has been wound the start wire is then repositioned to the top of the coil, the coil is stripped from the winding tools and is then inserted into a stator core.

More specifically, the method according to the present invention comprises positioning the start wire along one side of the segmented coil form whereby a portion of the start wire spans the space between the two sections of the segmented coil form. A start wire positioner is then moved into contact with the start wire and then deflects a portion of the start wire inwardly into the space between the coil form sections. The start wire is then clamped in that deflected position by a clamp. The coil is then wound on the coil form. Thus, at this time, the start wire is positively positioned inside the coil. After the coil is wound, the start wire is released from the clamp and a wire hook is rotated to reposition the free start wire end through the coil and out of the top of the coil. The wire hook is then retracted and the coil is stripped from the coil form for subsequent insertion into a stator core.

An advantage of the present invention is that the start wire of a coil is automatically repositioned into a position wherein damage to the start wire is prevented during insertion of the coil into a stator and during subsequent pressing and finishing operations of the stator coil. Since start wire positioning is accomplished as part of the coil winding process, the operation is very efficient and takes up very little time of the manufacturing process. Accordingly, the method and apparatus according to the present invention prevents damage to the start wire of a coil in a very efficient and economic manner.

The method according to the present invention, in one form thereof, comprises repositioning a start wire from one end of a wound coil to another end of the coil during the winding of the coil in a coil winding apparatus. The coil winding apparatus includes a segmented coil form with a space separating two of the segments. The start wire is first positioned along one side of the coil form with a portion of the start wire bridging the space. The start wire portion is then deflected into the space and clamped in the deflected position. The coil is then wound on the coil form and the start wire is repositioned from its deflected position through the coil so that it will extend out of the other end of the coil.

The present invention, in one form thereof, comprises a method for positioning a coil start wire during the winding of a coil in a coil winding apparatus. The coil winding apparatus includes a segmented coil form having a space which separates the coil segments and a start wire positioner including a clamp, a deflecting finger and a wire hook. The start wire is first positioned along one end of the coil form with a portion of the start wire bridging the space. A portion of the start wire is then deflected into the space between the coil form segments. The start wire is now clamped in the deflected position and a coil is wound on the coil form. The start wire is then repositioned through the coil to extend out of the top of the coil.

The present invention, in one form thereof, comprises a method for positioning a coil start wire through a wound coil during the winding of the coil in a coil winding apparatus. The coil winding apparatus includes a coil form comprising two coil form sections separated by a space. The coil winding apparatus further includes a wire dispenser and a start wire positioner which includes a deflecting finger, a clamp, and a wire hook. The method comprises positioning the start wire along at least one side of the coil form to bridge the space and then moving the deflecting finger into contact with the start wire and moving the finger, the clamp, the wire hook, and a portion of the start wire into the space. The start wire is then positioned into the clamp and clamped. The coil is now wound on the coil form. The start wire is then released from the clamp and the wire hook and start wire are moved through the coil. The coil is then stripped from the coil form.

The present invention, in one form thereof, comprises an apparatus for winding a coil and for repositioning the coil start wire from one end of the coil to the end of the coil. The apparatus comprises a segmented coil form including a space separating two segments of the form. The apparatus further includes a wire dispenser for winding a coil on the coil form. A start wire positioner is operably associated with the coil form for repositioning the start wire of the coil from one end of the coil, through the coil and out of the other end of the coil.

It is an object of the present invention to provide a start wire positioning mechanism and method for a coil winding machine which prevents damage to the start wire during the insertion and subsequent pressing operations of the stator coils of a dynamoelectric machine.

A further object of the present invention is to provide a method and apparatus for positioning a start wire which are reliable and efficient.

BRIEF DESCRIPTION OF THE DRAWINGS

The above mentioned and other features and objects of this invention and the manner of attaining them will become more apparent and the invention itself will be better understood by reference to the following description of an embodiment of the invention taken in conjunction with the accompanying drawings, wherein:

FIG. 1 is a cross-sectional elevational view of the stator of an electric motor with two windings and with the start wire of the auxiliary winding positioned between the two windings;

FIG. 2 is a front elevational view of the positioning apparatus according to the present invention;

FIG. 3 is a top plan view of the positioning mechanism of FIG. 2;

FIG. 4 is a partial enlarged view of the deflecting finger and clamp of the positioning mechanism of FIG. 2;

FIG. 5 is a partial elevational view of the end of the wire hook of the positioning mechanism of FIG. 2;

FIG. 6 is a top plan view of a coil as it is being wound and of the deflected position of the start wire inside the coil;

Corresponding reference characters indicate corresponding parts throughout the several views of the drawings.

Figure 7:
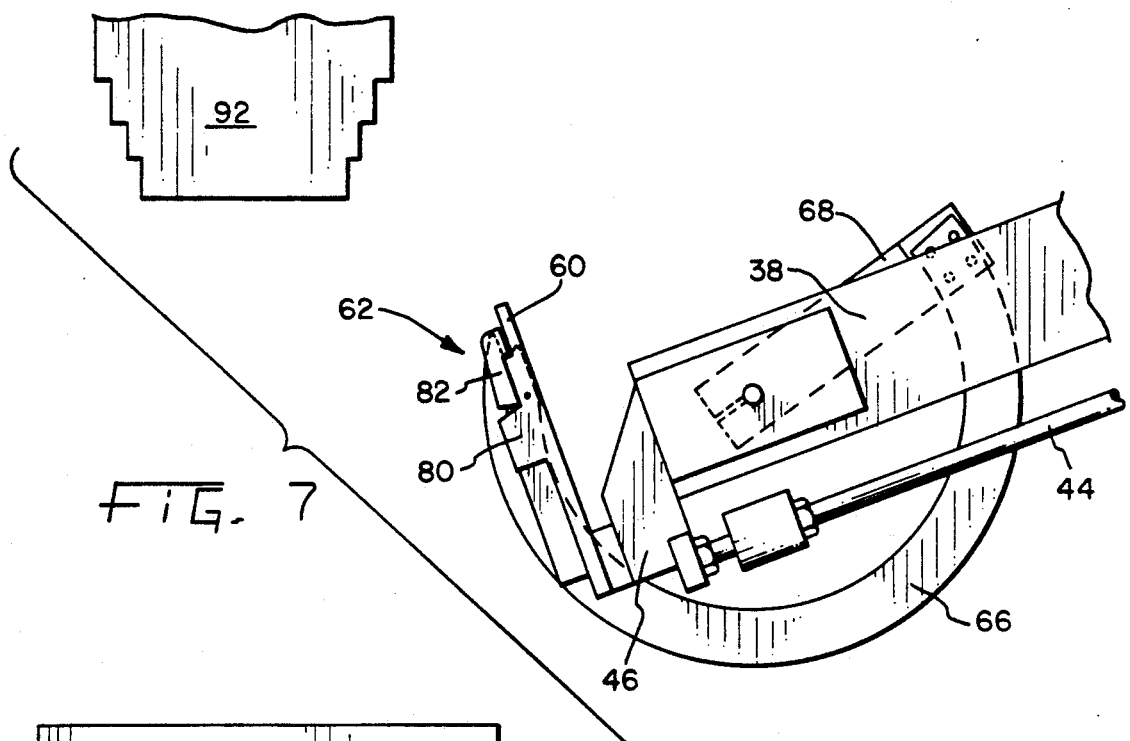
FIG. 7 is an elevational view showing the relative position of the coil form and the rest position of the start wire positioning mechanism.

The exemplifications set out herein illustrate a preferred embodiment of the invention, in one form thereof, and is not to be construed as limiting the scope of the disclosure or the scope of the invention in any manner.

DESCRIPTION OF THE PREFERRED EMBODIMENT

Referring to FIG. 1 there is shown a conventional stator core with a portion thereof broken away. The stator core is formed of laminations 12 and includes a bore 14. A main winding 16 and an auxiliary winding 18 are inserted into stator core slots 20 located inside bore 14. The start wire 22 of auxiliary winding 18 is shown located in a preferred position between the two windings 16 and 18.

If the auxiliary winding 18 were wound on conventional winding equipment without any special positioning of the start wire and were then inserted into the stator core, the start wire would be located on the bottom of the coil bundle and, after insertion, on the inside or bore side of winding 18. In that position start wire 22 would be subject to damage as explained hereinabove. The method and apparatus of the present invention, as further described hereinbelow, repositions the start wire from the bottom or bore side of the coil bundle 18 to the inside or top side of the coil bundle 18, prior to insertion of coil 18 into the stator core. After repositioning the wire to the top of the coil bundle and conventional insertion the start wire will be located between the two coil bundles as indicated in FIG. 1.

Referring now to FIGS. 2 and 3, the start wire positioning mechanism 30 is shown. A base 32 is provided with a bracket 34 to support the positioning mechanism. A pivot plate 31 is pivotally connected to bracket 34 by means of shaft 36. A pair of guide members 40a and 40b are mounted to this pivot plate 31. A slide plate or arm 38 is slidably received in guides 40a and 40b. A cylinder 42 having an activating rod 44 is connected to a bracket 46 which in turn is connected to slide 38. Thus, cylinder 42 can cause slide 38 to move outwardly or inwardly in guides 40 which, as pictured in FIG. 2 and 3, is respectively from right to left and vice versa. A cylinder 48 is also provided including an activating rod 50 which in turn is connected to a rod eye 52. By activating cylinder 48, the slide assembly including slide 38, guides 40a, 40b, pivot plate 31, and activating rod 44 and bracket 46 may be made to pivot upwardly or downwardly on shaft 36. Thus, arm 38 together with bracket 46 may pivot about shaft 36 and may be extended or retracted outwardly and inwardly as viewed in FIGS. 2 and 3.

As best seen in FIGS. 2-5, bracket 46 has secured to the end thereof a clamp assembly 62 and a contact or deflecting finger 60. Clamp assembly 62 includes a clamp cylinder 64 for activating the clamp. Slide 38 also has pivotably secured thereto a wire hook 66 which is rotated by means of a lever 68, a shaft 70 and a rotary actuator 72. A support rod 74 is also secured to guides 40a, 40b and slide plate 38 for purposes further explained hereinafter. A sliding support 76 is provided for rod 74.

As best seen in FIG. 4, clamp assembly 62 includes a clamp body 80 and a pivoting clamp 82. A coil start wire 84 is shown clamped between clamp body 80 and clamp 82. Contact finger 60 forms an extension of clamp body 80. By actuation of cylinder 64, activating rod 88 can activate clamp 82 to clamp start wire 84 as shown in FIG. 4. When cylinder 64 is deactivated, spring 86 forces clamp 80 to open, thereby releasing start wire 84. As seen in FIGS. 4 and 5, located immediately side by side and adjacent to clamp assembly 62 is the end portion of wire hook 66 including a slot 90. Thus, as shown in FIG. 4, as start wire 84 is clamped in clamp assembly 62, slot 90 is aligned to receive start wire 84 when wire hook 66 is rotated clockwise.

The operation of the apparatus is illustrated in FIGS. 6-9. Initially, at the start of the cycle, the start wire positioning mechanism 30 is in the downwardly pivoted, at rest position as shown in FIG. 7. In this position slide 38 is in its retracted position, and bracket 46 is pivoted downwardly, out of the way of the segmented coil form 91 of which one segment 92 is shown in FIG.

Figure 8:
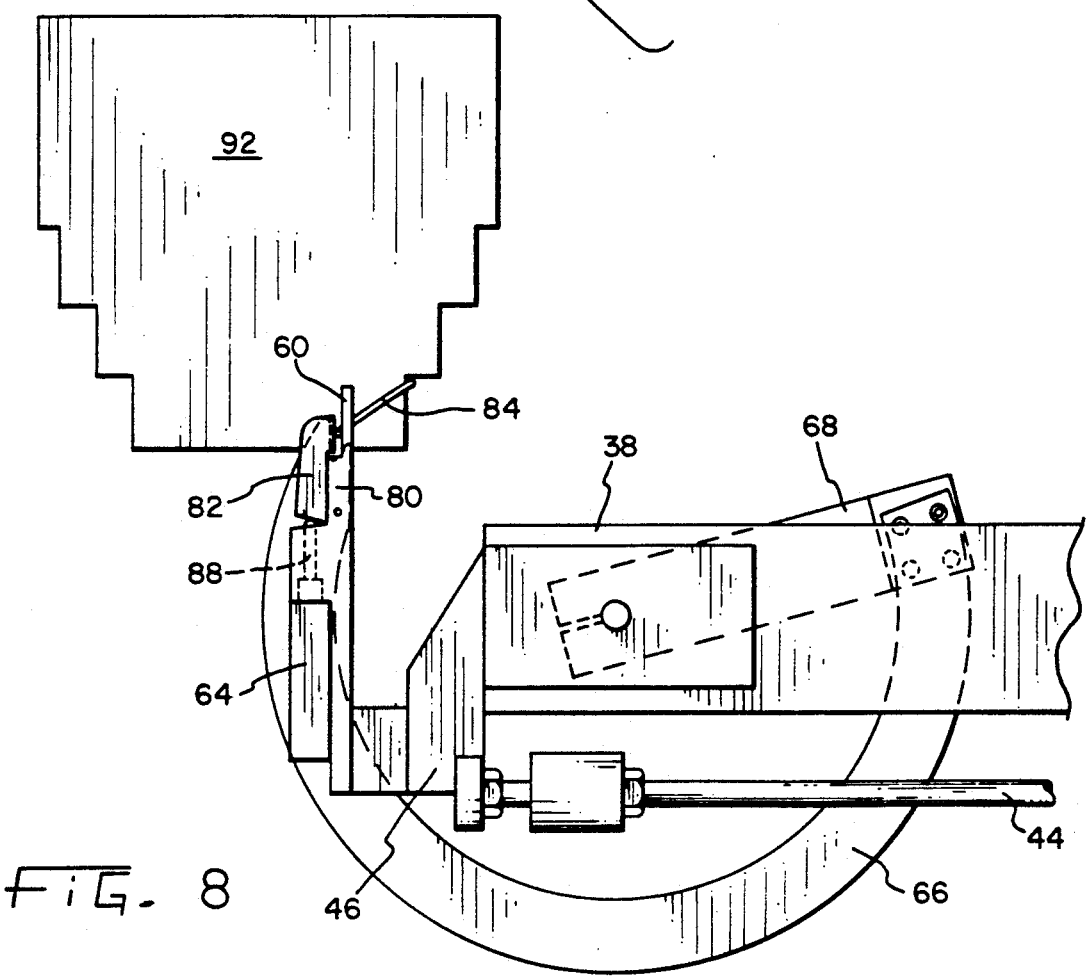
FIG. 8 is an elevational view of the coil form and the start wire positioning mechanism after the mechanism has pivoted into the operating position.

7. The coil form 91, as conventionally constructed, includes two or more segments or sections 92 and 94 which are separated by a space 96 as best seen in FIG. 6. These segments may be adjusted relative to each other for winding various sizes of coils. Conventionally the coil form sections 92 and 94 are stepped as seen in FIG. 7 whereby a coil bundle may be formed having coil sections of various sizes for insertion into the various slots of a stator core. The winding dispenser or flyer 102 shown in FIG. 6 is at rest at this time with the end of the start wire clamped in a cut/clamp unit 98. The start wire positioner mechanism 30 is now pivoted to its upright or horizontal position. Slide 38 is still in its retracted position at this time. The clamp assembly 62 will be deactivated. The wire dispenser or flyer 102 is now rotated approximately 180° to place the first turn of wire on the right hand side on the lowest winding section of the winding form as shown in FIG. 6. Thus, the start wire 84 will bridge space 96 between coil form sections 92 and 94. Flyer 102 will then stop and slide 38 is extended so that finger 60 contacts start wire 84 and deflects start wire 84 inwardly into space 96 as seen in FIG. 8. A portion of start wire 84 as well as clamp assembly 62, finger 60 and the end of wire hook 66 will now be located between the coil form sections 92 and 94, out of the way of the exterior surfaces of coil form 91 on which coil 100 will be wound. Thus winding of the coil can proceed unimpeded by positioning mechanism 30 while start wire 84 is positively positioned inside coil form 91. The winding tools are lowered to the first winding position so that coil form 91 is ready to receive the first layer of coil windings. As coil form 91 and cut/clamp 98 are lowered, start wire 84 will be lowered into clamp assembly 62. Cylinder 66 can therefore be activated so that clamp 82 clamps start wire 84. Start wire 84 will only be clamped lightly by clamp assembly 62 so that start wire 84 can still move in clamp 82 as coil form 91 is lowered prior to winding additional coil layers on the stepped coil form. Further it should also be noted by reference to FIG. 4 that the start wire 84, in its clamped position, will be located just above the bottom of slot 90 of wire hook 66.

By reference to FIGS. 3 and 6 it can be seen that wire hook 66 is located parallel to and immediately next to clamp assembly 62. Thus, in the position of start wire 84 as shown in FIG. 4 wire hook will be in position to capture start wire 84 as wire hook 66 moves clockwise as further explained hereinafter.

The winding cycle is now continued by the rotation of flyer 102 relative to coil form 91. A layer of coil is therefore wound on the lowest winding section or stepped portion of coil form 91. Coil form 91 is then stepped downwardly and another layer of wire is wound on the second stepped portion of coil form 91. Some time during this process the end of start wire 84 will be unclamped from cut/clamp unit 98. Winding of the coil continues on the stepped portions of coil form 91 until the coil is completed. At this time as best seen in FIG. 6, start wire 84 is still positively positioned inside coil form 91.

Figure 9:
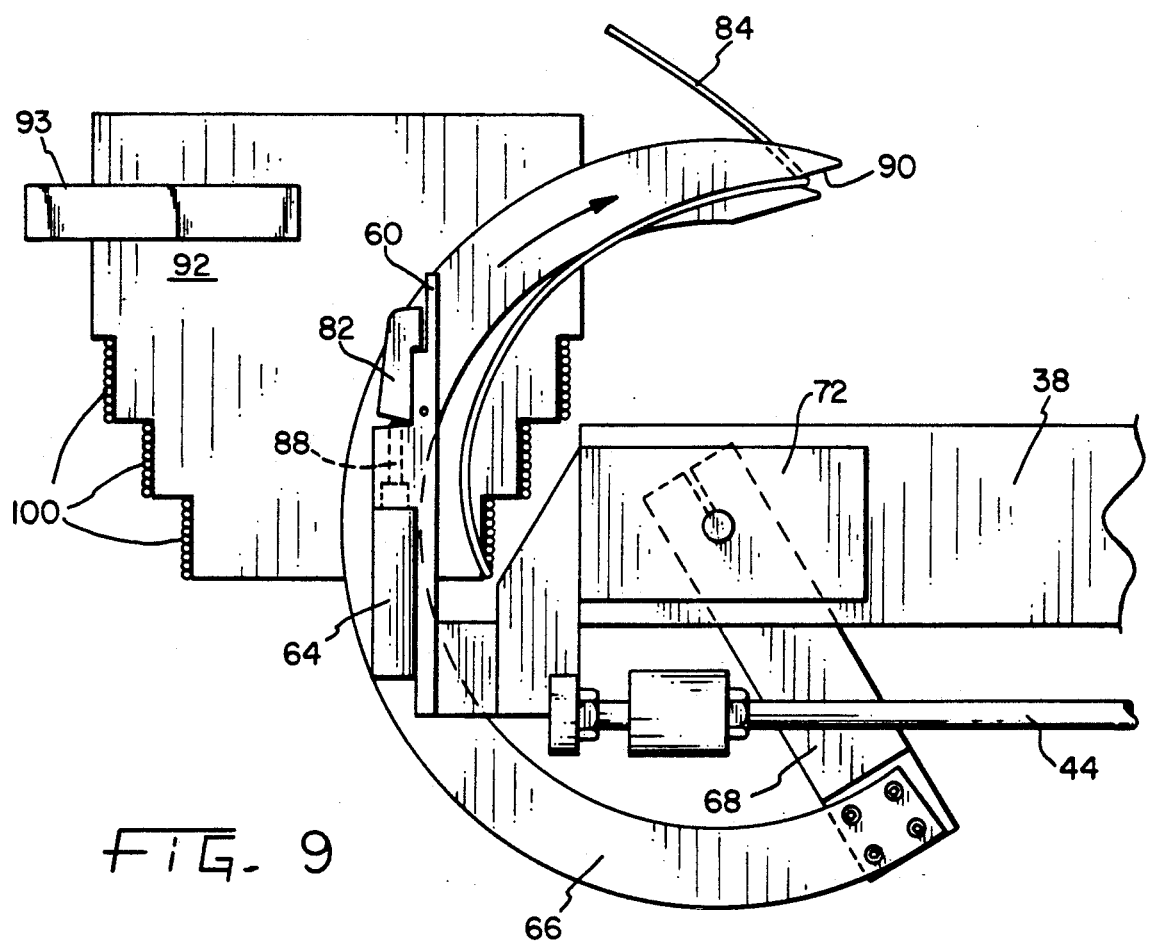
FIG. 9 is an elevational view of the coil form and the wire positioning mechanism as the start wire is being positioned through the coil by the wire hook.

Referring now to FIG. 9, wire hook 66 is rotated by the actuation of rotary actuator 72. The movement of wire hook 66 will capture start wire 84 in slot 90 and will move the free wire end through the inside of coil 100 and out over the top of the coil bundle. The wire hook 66 is now retracted and wire clamp 82 is opened by deactivation of cylinder 64. Start wire positioning mechanism 30 is now pivoted downwardly to move clamp assembly 62 and wire hook 66 out of the coil. Slide 38 is now retracted. As start wire positioning mechanism 30 is lowered, rod 74 will continue to support coil 100 until slide 38 is retracted sufficiently far. Stripper 92 will now strip the coil from coil form 91. It should be noted from FIG. 3 that arm 74 is longer than slide 38 and therefore extends further to the left as seen in FIG. 3. Thus arm 74 will support coil 100 to prevent interference of the coil with clamp assembly 62 and the end of wire hook 66 as arm 38 is retracted.

It should be noted that, while clamp 82 is opened only after start wire 84 has been repositioned through the coil bundle, clamp 82 could be opened prior to movement of wire hook 66 to capture start wire 84 and repositioning of start wire 84.

Another manner of constructing the coil form would be to form a recess in the lowest winding section of coil form 91. The start wire 84 could be positioned in the recess while several layers of coil wire are then wound on this lowest winding section. Thus more turns of wire could be wound and stored on the winding section while the start wire could be deflected and repositioned in the same way as explained hereinabove.

Another variation on the invention would be to initially position and store the start wire 84 outside of the coil form, out of the way of the winding head and layers of coil to be wound. After winding of the coil the start wire would then be repositioned through the coil identically as disclosed hereinabove.

Still another variation on the invention would be to initially deflect and position the start wire 84, to then complete winding of the coil, and thereafter to thread the start wire 84 through the layers of coil wire rather than through the center of the coil to reposition the start wire from the bottom of the coil bundle to the top of the coil bundle.

What has therefore been shown is a very effective and efficient mechanism and method for positioning a start wire and for moving the start wire from the bottom of a coil bundle to the top of the coil bundle as the coil is being wound.

While this invention has been described as having a preferred design, it will be understood that it is capable of further modification. This application is therefore intended to cover any variations, uses, or adaptations of the invention following the general principles thereof and including such departures from the present disclosure as come within known or customary practice in the art to which this invention pertains and fall within the limits of the appended claims.

What is claimed is:

1. In a coil winding apparatus adapted to wind coils for subsequent insertion thereof into the stator of a dynamoelectric machine, a method for positioning a coil start wire through a wound coil during the winding of the coil, the coil winding apparatus including a segmented coil form having at least two coil form segments, a space separating said at least two coil form segments, a start wire positioner including a clamp, a deflecting finger, and a wire hook, said method comprising:
   initiating winding a coil by positioning a start wire along one side of the coil form with a portion of the start wire bridging the space;
   deflecting a portion of the start wire into the space;
   clamping the start wire in the deflected position;
   completing winding of a coil on the coil form; and repositioning the end of the start wire through said coil; and stripping said coil from the coil form.

2. The method according to claim 1 wherein said deflecting step comprises moving the deflecting finger against the start wire and into the space.

3. The method according to claim 1 including the step of positioning the start wire into the clamp after said deflecting step and prior to said clamping step.

4. The method according to claim 1 wherein said repositioning step comprises capturing the start wire in the wire hook and moving the wire hook and the end of the start wire through the coil.

5. The method according to claim 4 wherein the wire hook is rotated through an angle for movement through the coil and wherein the angle of rotation of the wire hook is in the range of 90°-180°.

6. The method according to claim 1 wherein, prior to the clamping step, the coil form and clamp are moved relative to each other to position the start wire in the clamp in position to enable the wire hook to capture the start wire.

7. The method according to claim 1 wherein the start wire is lightly clamped in the clamp to permit movement of the start wire in the clamp.

8. A method for positioning a coil start wire through a wound coil during the winding of a coil in a coil winding apparatus, said coil winding apparatus including a coil form comprising at least two coil form segments separated by a space, a wire dispenser, and a start wire positioner which includes a deflecting finger, a clamp, and a wire hook, said method comprising:

positioning a start wire along at least one side of the coil form to bridge the space;

moving the deflecting finger into contact with the start wire and deflecting the finger, the clamp, the wire hook, and a portion of the start wire into the space;

positioning the start wire into the clamp in a position wherein the wire hook is enabled to capture the start wire;

clamping said start wire in said clamp;

completing the winding of a coil on the coil form;

releasing the start wire from the clamp;

moving the wire hook and start wire through the coil; and stripping the coil from the coil form.

9. The method according to claim 8 wherein the start wire is lightly clamped in the clamp to permit movement of the start wire in the clamp.

10. The method according to claim 8 wherein the wire hook is rotated to extend the wire hook and start wire through the coil.

11. The method according to claim 10 wherein the wire hook is rotated through an angle in the range of 90°-180°.

12. The method according to claim 8 including the step of relatively moving the coil form and clamp with respect to each other to position said start wire into the clamp in a position wherein the wire hook is enabled to capture the start wire.

13. A method for repositioning a start wire from one end of a wound coil to the other end of the coil during the winding of the coil in a coil winding apparatus which is adapted to wind coils for subsequent insertion thereof into the stator of a dynamoelectric machine, the coil winding apparatus including a segmented coil form having at least two segments separated by a space, the method comprising:

initiating winding of the coil by positioning a start wire along one side of the coil form at a first end of the coil form with a portion of the start wire bridging the space;

deflecting a portion of the start wire into a deflected position away from the plane in which one of the sides of a coil is to be wound;

clamping the start wire portion in said deflected position;

completing the winding of a coil on the coil form;

repositioning the start wire from the deflected position to another end of the coil form; and stripping said coil from said coil form.

14. The method according to claim 13 wherein said deflected position of said start wire is adjacent the one end of the coil and said repositioned position of the start wire is adjacent the other end of the coil.

15. An apparatus for winding a coil and for positioning the start wire of the coil from one end of said coil to the other end of said coil, said apparatus comprising:

a segmented coil form having at least two segments separated by a space;

a wire dispenser for winding a coil on said coil form;

a start wire positioner operably associated with said coil form for repositioning a start wire of said coil from one end of said coil through said coil and out of the other end of said coil; and means for stripping said coil from said coil form.

16. The apparatus according to claim 15 wherein said start wire positioner includes a clamp means for clamping said start wire.

17. The apparatus according to claim 15 wherein said start wire positioner includes a moveable wire hook for capturing said start wire and for repositioning said start wire through said coil.

18. The apparatus according to claim 17 wherein said wire hook is rotatable through an angle in the range of 90°-180°.

19. The apparatus according to claim 15 including a deflecting finger for deflecting a portion of said start wire into said space.

20. The apparatus according to claim 15 wherein said positioner is pivotally mounted for pivoting movement between operative and inoperative positions.

21. The apparatus according to claim 15 wherein said start wire positioner includes an extendable arm having a deflecting finger at one end thereof for deflecting into said space a portion of a start wire positioned against said coil form by said wire dispenser.

22. The apparatus according to claim 21 wherein said arm includes a clamp for clamping said start wire.

23. The apparatus according to claim 22 wherein said start wire positioner further includes a wire hook having a capturing means positioned adjacent said clamp, whereby a start wire clamped in said clamp is positioned to enable said capturing means to capture said start wire.

24. The apparatus according to claim 22 wherein said clamp is adapted to lightly clamp said start wire and to permit movement of said start wire in said clamp.

* * * * *